Oct. 26, 1948.    R. C. BASCOM    2,452,347
VULCANIZATION
Original Filed May 1, 1937
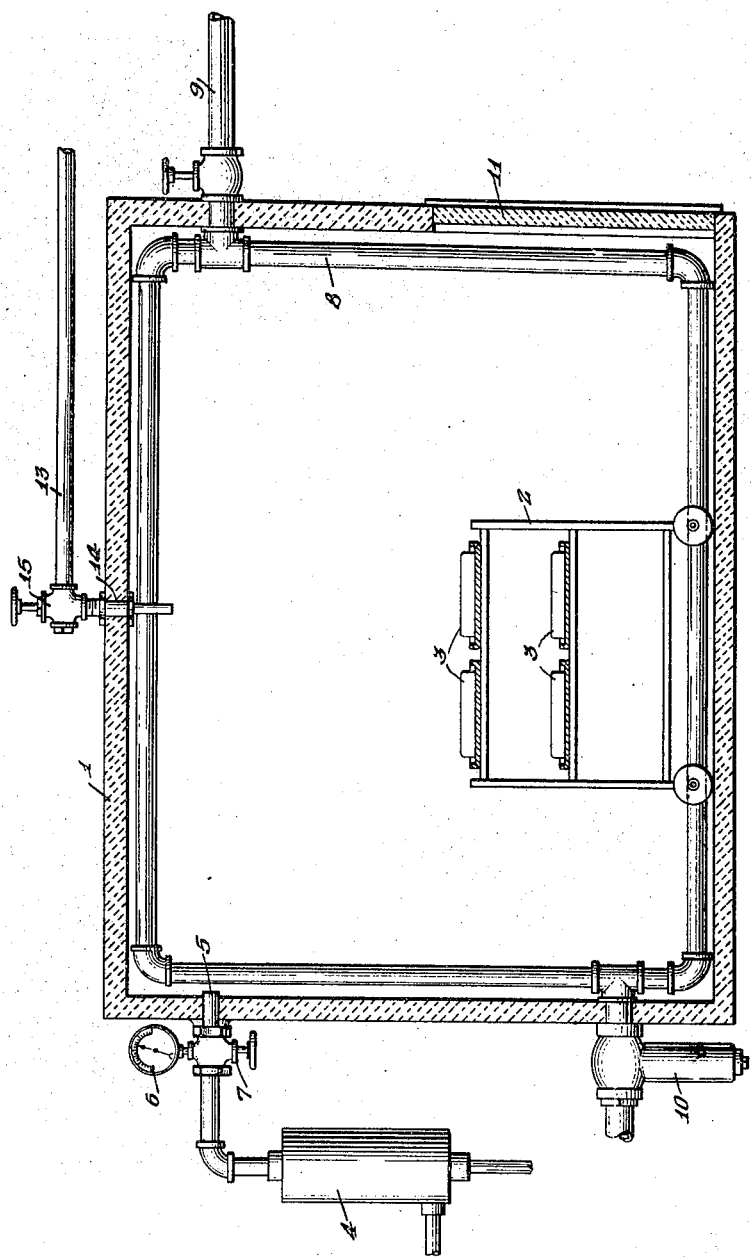

UNITED STATES PATENT OFFICE 2,452,347

VULCANIZATION

Roger Charles Bascom, Port Clinton, Ohio, assignor to Rubatex Products, Inc., New York, N. Y., a corporation of Delaware Original application May 1, 1937, Serial No. 140,156. Divided and this application February 13, 1943, Serial No. 475,800

1 Claim. (Cl. 260—725)

This case is a division of my application Serial No. 140,156, filed May 1, 1937, now Patent No. 2,310,926.

My invention relates to a novel process for manufacturing rubber and more particularly relates to a novel process for manufacturing expanded rubber both of the cell tight cellular type and of the sponge or inter-connecting cellular type.

In the manufacture of expanded rubber, it is essential that vulcanization should synchronize with the gassing of the rubber and, particularly, that no or very slight vulcanization should occur before the rubber has been at least gassed.

Usually the accelerators which are employed tend to cause vulcanization to occur at some stage in the process before the time when it is desired that vulcanization should begin, i. e., before gassing, and in this manner, produces a defect in the final product.

Moreover, not only must vulcanization occur at the proper stage, the degree of vulcanization is important since it must be just sufficient to hold the gas and not so much that it creates any undue strain in expanding the rubber.

This problem is accentuated by the fact that in gassing rubber, particularly when the gas is applied externally under pressure, the degree of penetration and absorption depends upon the plasticized condition of the rubber. The plasticity of the rubber, in turn, is a function of the temperature. In practice I have found that the optimum penetration and absorption of nitrogen gas at the normal pressures employed, i. e., 3000 pounds per square inch is obtained at 265° Fahrenheit. In fact, from experimentation, I have found that saturation of rubber one-half inch thick will take four hours when the rubber is plasticized at a temperature of 215° Fahrenheit and the pressure applied is 3000 pounds per square inch. At a temperature of 300° Fahrenheit, the same thickness of rubber will be saturated in one hour using the same pressure. At this high temperature, however, accelerators will vulcanize the rubber so that with the use of high temperature it is impractical, if not inoperative, to employ accelerators.

I have discovered a process in which I eliminate the presence of accelerators during the period of penetration or absorption of the gas in the rubber, the rubber having as a constituent a retarder to prevent substantially any vulcanization even at the temperature of 300° F. at which even rubber-sulphur mixes tend to vulcanize. A gaseous accelerator is introduced after gassing has been either partially or substantially completed in order to control the vulcanization to that stage.

Accordingly, an object of my invention is to provide a novel process for the manufacture of rubber.

A further object of my invention is to provide a novel process for manufacturing gas-expanded rubber.

Still another object of my invention is to provide a novel process for critically controlling the period when vulcanization starts in the manufacture of rubber.

Still another object of my invention is the step in the manufacture of expanded rubber of introducing ammonia gas after the rubber has been either partly or completely gassed.

It is well known in the art that aldehydes, such as formaldehyde, acetaldehyde, furfuraldehyde, glucose, and benzaldehyde, are retarders of vulcanization. Accordingly, in carrying out my invention I have found that I may by the addition of such retarding agents prevent vulcanization even at the higher temperatures most desirable for plasticizing the rubber and by using ammonia gas convert these retarding agents themselves into accelerators. This is due to the fact that ammonia gas combines with these aldehydes to form aldehyde-ammonia condensation products. Aldehyde-ammonia condensation products have long been known as good accelerators for vulcanization. Thus, for example, hexamethylene tetra-amine is a good example of an accelerator which is a condensation product of formaldehyde and ammonia gas. Similarly, acetaldehyde-ammonia is a condensation product of acetaldehyde and ammonia. By employing the retarders referred to above and admitting ammonia gas at the proper stage in the process, I convert these retarders to accelerators, thus effectively controlling the degree of vulcanization until the proper stage and thereafter obtaining a high-speed vulcanization. This control is particularly important in the manufacture of expanded rubber where it is desired during the early stages of the process to work with a rubber composition which is extremely plastic and control the composition so that during the gassing stage, the rubber vulcanizes so that its physical state changes to a slightly less plastic state.

Accordingly, an object of my invention is to provide a novel process in the manufacture of rubber which comprises normally employing retarders during the early stages of the process and converting these into accelerators in the subsequent stages.

A further object of my invention is to provide a novel process for controlling acceleration in the manufacture of rubber.

Still a further object of my invention is to provide a process in which aldehydes are converted into aldehyde-ammonia condensation products.

There are other objects of my invention which, together with the foregoing, will appear in the detailed description which is to follow.

Figure 1 is a side elevation and cross-section of the apparatus showing the means by which the process of this invention may be carried out.

Referring more specifically to the drawing, in Figure 1 is shown a chamber 1 in which a truck 2 containing rubber 3 is placed. By means of a pump 4 a gas is forced into the chamber 1 to impregnate the rubber through the opening 5. The pressure of the gas is controlled by means of the gauge 6 and the valve 7. The chamber is heated by heating pipe 8 supplied with heating fluid in the pipe 9. A steam trap 10 provides for the outflow of the heating fluid. A door 11 is provided at the side of the chamber so that the truck may be inserted and withdrawn. Through a gas pipe 13 and a nozzle 14, the gas which accelerates the vulcanization is brought into the chamber. The flow of this gas is controlled by the valve 15.

When carrying out my invention I employ any one of the formulas mentioned herewith and proceed as described below.

After suitable mixing and calendering of these compounds in a manner well known in the art I prepare the rubber for gassing by admitting it to an autoclave and raising its temperature to from 215° to 300° F. and preferably to 300° F. At these temperatures as already explained the normal tendency for the rubber to vulcanize is inhibited by the retarder employed.

This temperature rise may be obtained either by directly heating the rubber or in a preferred form by introducing hot gas with which the rubber is to be saturated sufficient to bring the rubber to the desired temperature. As is already well known in the art for this purpose, an inert gas, such as nitrogen is employed at a pressure of the order of 3000 pounds per square inch, although it will be understood that this pressure may be varied in accordance with the desired density of product. At the high temperature at which the rubber is maintained, it is relatively plastic so that the gas easily penetrates and is absorbed by the rubber.

In order to understand the importance of this plasticizing it should be understood that in subjecting the rubber to gas at this pressure some of the gas goes into solution in the rubber forming a homogeneous mixture of gas and rubber, the dissolved gas being dispersed throughout in particles which are of the order of molecular size. Solutions of gas and rubber are a physical phenomenon characterized by an appreciable time for equilibrium to occur, that is, there is a measurable time necessary before the solution becomes homogeneous throughout the mass of rubber. Solution naturally occurs on the surface first and disperses toward the center thereafter. This dispersion is referred to as penetration or impregnation.

The speed of penetration is the velocity at which this dispersion occurs. When the rubber solution is substantially homogeneous, complete penetration has been obtained. Saturation of the rubber by gas occurs when the maximum amount of gas which the rubber can hold is in solution. This saturation, in turn, will vary with temperature and pressure of the gas.

It will be clear from the above that by raising the rubber temperature to from 215° to 300° F., the rate of penetration will be increased so that the rubber one-half inch thick is saturated with gas in about an hour at 300° F.

The gas pressure is now released and the rubber is permitted to expand. In expanding bubbles of gas are formed throughout the rubber mass, each bubble producing minute cells. These cells may be individually sealed cells or they may be inter-communicating cells, depending on the state of vulcanization, the rate of pressure release and other factors not well known to date.

After the nitrogen pressure has been removed, ammonia gas is admitted to the rubber at a pressure of the order of 10 pounds per square inch above atmospheric pressure and at approximately the temperature of the rubber and this pressure is maintained until complete vulcanization occurs. The ammonia gas neutralizes the retarder and at the same time acts as an accelerator to initite and assist in the completion of vulcanization.

Although in the above, I have described the process as being carried on entirely in an autoclave, it is also possible in accordance with my invention to remove the rubber from the expensive autoclave which necessarily if it is to maintain pressures of the order of 3000 pounds per square inch is a relatively expensive device and carry on the vulcanization by employing a large and less expensive autoclave into which the ammonia gas is admitted in carrying out the above process.

It will be noted that penetration of the gassed and expanded rubber by ammonia is very rapid. Full penetration at room temperature is accomplished in less than one hour for samples one inch thick or more after expansion.

In another form of my invention I may mix my ammonia gas with my nitrogen admitting the two to the rubber and thoroughly saturating the rubber with both the nitrogen and the ammonia gas simultaneously and at a combined pressure of 3000 pounds per square inch. The ammonia in that case will institute a partial vulcanization during gassing. In this modified form of the process, full advantage of the plasticizing temperature cannot be taken because of the tendency of ammonia to cause vulcanization and the plasticizing temperatures must be kept in the order of 215° F. to prevent complete vulcanization during gassing. On the other hand, the ammonia adds its blowing effect to the nitrogen. After gassing, complete vulcanization is obtained by raising the rubber temperature and then releasing the pressure.

The following are examples of compounds which may be employed in my process:

|  | Soft | Hard |
|---|---|---|
|  | (1) | (1) |
| Rubber | 100 | 100 |
| Sulphur | 3 | 50 |
| Zinc Oxide | 5 |  |
|  | (2) | (2) |
| Rubber | 100 | 100 |
| Sulphur | 3 | 50 |
| Zinc Oxide | 5 |  |
| Salicylic Acid | 2 | 2 |
| Condensation products of Methylene and Aniline | 1 |  |
|  | (3) | (3) |
| Rubber | 100 | 100 |
| Sulphur | 3 | 50 |
| Zinc Oxide | 5 |  |
| Paraformaldehyde | 1 | 1 |
|  |  | Hard reinforced |
|  |  | (4) |
| Rubber |  | 100 |
| Sulphur |  | 50 |
| Phenol-Formaldehyde Type B. Resin |  | 50 |
|  | (5) |  |
| Rubber | 100 |  |
| Sulphur | 3 |  |
| Zinc Oxide | 5 |  |
| Condensation product of acetaldehyde and aniline | 1 |  |
| Paraformaldehyde | 2 |  |

In each of the compounds employed, the reactions which take place when the ammonia gas is admitted for transforming the retarder into an accelerator may be explained as follows:

In the case of the formula No. 1 where no retarder is employed and no accelerator, substantially no vulcanization occurs until the ammonia gas is admitted, even though the temperature of the rubber reaches a temperature on the order of 260° F. Accordingly, all the necessary action during the gassing operation may be carried out without in any way endangering the process by too much vulcanization. At the proper stage in the operations the admission of the ammonia gas is, in effect, an introduction of an accelerator which will instigate vulcanization and which will then continue in accordance with my process.

In the case of formula No. 2 employing a retarder, salicylic acid, and an accelerator which is the condensation product of methylene and aniline, the salicylic acid retards the vulcanization sufficiently so there is substantially no vulcanization during the gassing operation. Accordingly, plasticizing temperatures as high as 300° F. may be employed. During the subsequent treatment with ammonia gas, the salicylic acid is neutralized and the accelerator in conjunction with ammonia which is also an accelerator, causes the rubber to vulcanize in a reasonably short time.

In the third case, formula No. 3, I have used paraformaldehyde as an example. Paraformaldehyde acts as a retarding agent, effectively retarding the vulcanization during the gassing stage. Here again a plasticizing temperature of 300° F. is practical. However, during the treatment with ammonia gas, paraformaldehyde and ammonia condense to form hexamethylene tetra-amine which is an effective accelerator of rubber vulcanization.

In the fourth case, formula No. 4, for reinforced hard material contains rubber, sulphur and a phenolformaldehyde resin, condensation of which has been carried to the B stage where the resin is still fusible and still soluble. This particular resin that I am using has a surplus of formaldehyde incorporated with it and required ammonia as a catalyst to complete the condensation to a marketable product. It is obvious that the surplus formaldehyde in the resin will act, as far as the rubber mix goes, similar to compound No. 3, preventing vulcanization in the gassing operation but being converted to an accelerator, hexamethylene tetra-amine, during the treatment with ammonia gas.

In the manufacture of hard expanded rubber, it is desirable to use carbon dioxide as the gassing agent because of its extreme solubility compared to nitrogen in rubber. By using phenol-formaldehyde resin we can reinforce the cell structure of our hard material sufficiently to withstand the partial vacuum in the cells which occurs when the carbon dioxide diffuses through the cells into the atmosphere.

As a further variation in my process, using the compound No. 5 which contains the condensation product of acetaldehyde and aniline as an accelerator and paraformaldehyde as a retarder, the gassing operation is conducted in the same way as the others. However, since paraformaldehyde will condense with ammonia gas to form hexamethylene tetra-amine, the combination of hexamethylene and the condensation product of acetaldehyde and aniline will cause vulcanization to ensue at very low temperatures of the order of 150° F.

It will be noted that in the case of hard materials, the proportion of sulphur being higher than in the case of soft, it is necessary to use either less accelerator or more retarder to achieve results comparable with the soft.

The methods I propose to employ for the vulcanization of our finished material are obvious from the above description, but there will be, of course, variations of the above procedure, depending upon the finished product desired. For example, it will be possible to gas the rubber with any of the above compounds and subsequently treat the expanded vulcanized or partially vulcanized rubber with ammonia gas at room temperature. Thereafter, I may place the rubber in molds and complete the vulcanization between steam platens. Likewise the above compounds may be modified with filters, reclaimed rubber or other well known compounding ingredients.

From the above, it will now be clear that I have discovered a process for the manufacture of rubber in which vulcanization is controlled as desired during a predetermined stage in the manufacture, notwithstanding the fact that the vulcanizing agent sulphur is a part of the ingredients during this stage. I have more specifically illustrated this principle as applied to the manufacture of gas expanded rubber where it is particularly important that during the gassing operation there shall be substantially no vulcanization. As illustrated in these examples, I have accomplished this in one form of my invention by omitting accelerators during the gassing operation or by the use of retarders which act in a positive manner to control closely any such vulcanization. After the gassing is completed, I admit ammonia which either chemically transforms the retarder or acts in conjunction with the accelerators already present to instigate and accelerate vulcanization.

However, that same principle may be carried out by other compositions than ammonia gas. Thus, for example, I may replace the ammonia gas with a compound such as sulphur chloride.

In that case, however, my original rubber composition does not contain any or substantially any sulphur. After the gassing operation has been completed, I admit sulphur chloride as a gaseous vapor at room temperatures. It will be understood, however, that during the gassing operations the same conditions obtained as described above, that is, the rubber was plasticized to temperatures of the order of 280° F. and in fact, if desired, can go much higher since there is very little sulphur present. The sulphur chloride acts as a vulcanizing agent like sulphur except that it does not require any accelerator to carry on rapid vulcanization.

In the third process I may use hydrogen sulphide and sulphur dioxide which are alternately permitted to penetrate the gassed rubber at the completion of the gassing operation. In this case also it will be understood that very little or no sulphur need be mixed with the rubber compound during the gassing operations.

Thus it will be seen that I am not limited to the use of ammonia for preventing acceleration in the manufacture of gas expanded rubber during the gassing operations, but that other compositions if admitted at the proper stage enable me to gas the rubber while I may control the degree of vulcanization. Accordingly, I do not wish to limit myself to these several examples given but only insofar as set forth in the appended claim.

I claim:

The method of manufacturing gas expanded rubber which comprises forming a rubber mix free from any vulcanizing agent heating the rubber mix to a temperature of the order of 280° F., gassing the rubber mix at a pressure of the order of 3000 pounds per square inch to expand the same fully to its final shape; thereafter reducing the gas pressure and adding a vulcanizing agent including sulphur compounds to the expanded rubber and vulcanizing the rubber.

ROGER CHARLES BASCOM.

REFERENCES CITED

The following references are of record in the file of this patent:

UNITED STATES PATENTS

| Number | Name | Date |
| --- | --- | --- |
| 1,089,482 | Laarmann | Mar. 10, 1914 |
| 1,487,880 | Peachey | Mar. 25, 1924 |
| 1,630,721 | Snelling | May 31, 1927 |
| 1,717,168 | Noar | June 11, 1929 |
| 2,067,020 | Roberts | Jan. 5, 1937 |
| 2,158,083 | Peel | May 16, 1939 |
| 2,231,950 | Roberts et al. | Feb. 18, 1941 |
| 2,310,926 | Bascom | Feb. 16, 1943 |